Patented May 15, 1945

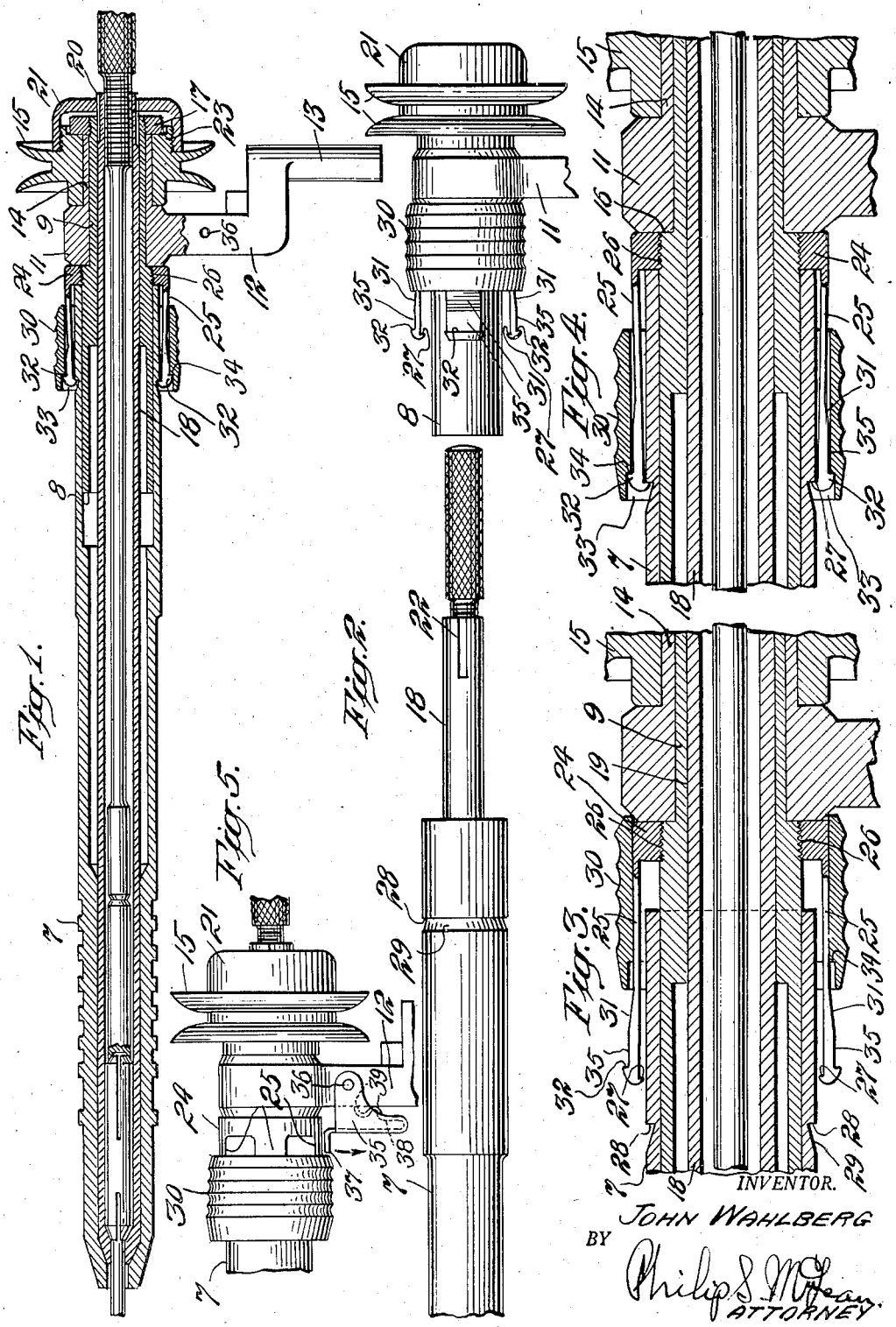

2,376,295

UNITED STATES PATENT OFFICE 2,376,295

DENTAL HAND PIECE

John Wahlberg, New York, N. Y., assignor to Nat Chayes, Rye, N. Y.

Application October 11, 1943, Serial No. 505,870

6 Claims. (Cl. 32—26)

The invention here disclosed relates to dental handpieces and more particularly to those parts of the mechanism pertaining to the sheath and its method of mounting.

The sheath should be freely rotatable, so as to turn with the fingers grasping it and it should be readily removable from the supporting structure.

It is furthermore desirable that any retaining means for the sheath should be concentric, apply any holding effect equally about the sheath and it should not in any way interfere with the free turning of the sheath.

The purposes of the present invention are to fully answer these several requirements or desired characteristics.

Particularly, it is a purpose of the invention to provide a practical symmetrical form of releasable sheath mounting which while firmly secured during operation of the handpiece will be quickly and easily releasable at any time and in any normal position of the fingers grasping the handpiece.

The novel features of the invention by which all the foregoing and other desirable objects are attained are hereinafter set forth, shown by way of illustration in the accompanying drawing and broadly covered in the claims.

In the drawing, there is shown but one present practical embodiment of the invention, but it will be recognized that structure may be variously modified and changed as regards this particular disclosure all within the true intent and broad scope of the invention as hereinafter defined and claimed.

Fig. 1 in the drawing is a broken longitudinal sectional view of one of the hand pieces, in the assembled operating condition.

Fig. 2 is a broken side elevation, showing the clutch closing sleeve pulled back to release the sheath and the sheath, carrying with it the spindle, removed from the headstock.

Figs. 3 and 4 are enlarged broken sectional views showing the sheath retaining clutch in the released and holding positions respectively.

Fig. 5 is a broken detail of a safety lock for the clutch.

In the hand piece illustrated, the sheath 7, is removably and rotatably engaged over the larger end portion 8, of a sleeve member having an opposite smaller end portion 9, rotatably engaged in a bearing 10, within the head 11.

This head forms a part of the supporting structure, being carried by an offset bracket arm 12, on the upper end of the pivotally mounted supporting post 13.

The headpiece 11, is shown as extended at the opposite side from the sheath supporting sleeve 8, in the form of a cylindrical hub 14, to provide interiorly an elongated bearing extension for the journal portion 9, of the sleeve and exteriorly a bearing for the spindle driving pulley 15.

The sheath mounting sleeve is shown as longitudinally centered in the supporting head by having an annular shoulder 16, at the inner end of the smaller diametered bearing portion 9, in rotatable engagement with the end face of the head and retaining nut 17, screwed on the outer end of such smaller bearing portion in rotatable engagement with the end of the stationary hub 14. This retainer serves the additional purpose in the illustration, of confining the pulley 15, in rotatable relation on hub 14.

The spindle, indicated at 18, is shown as having a freely rotatable bearing in the smaller diameter portion of the sleeve at 19. This spindle, as in former patent application Ser. No. 487,831, filed May 19, 1943, is driven from the pulley through a detachable jaw clutch type of coupling, involving clutch teeth 20, on a flange 21, carried by the pulley, entering in grooves or splines 22, in the end portion of the spindle. Coacting elements of the jaw clutch, preferably have a loose fitting engagement, enabling easy connection and disconnection and providing a self-centering driving relation from the pulley to the spindle. The driving flange 21, is shown in the form of a shallow cup screwed over a shoulder 23, on the outer face of the pulley, clear of and providing a cover over the retaining nut 17.

The sheath retaining clutch is shown in the form of a collar 24, of a size to pass over the smaller bearing portion of the sleeve and carrying spring fingers 25, at one side, to project longitudinally over the larger sheath supporting portion of the sleeve. As indicated particularly in Figs. 3 and 4, these spring fingers are spaced radially from the sleeve a greater distance than the wall thickness of the sheath, so as not to obstruct free rotation of the sheath in its supported position on the sleeve. The collar 24, may be secured in various ways on the sleeve. In the illustration, it is shown screwed at 26, over a shouldered portion at the inner end of the larger diameter part of the sleeve.

Rotatable holding engagement of the spring fingers with the sheath, is effected in the illustration, by sharply angled inwardly projecting lugs or teeth 27, on the free ends of such fingers, arranged to engage the abrupt annular shoulder 28, provided by the groove 29, in the sheath.

The spring fingers are tensioned to stand open as in Fig. 3, with the holding teeth 27, clear of the groove in the sheath and contraction of these fingers is effected in the illustration, by a closing ring 30, longitudinally slidable over the fingers. The fingers or what may be considered the jaw elements of this clutch, are shown as having inclines 31, serving as cams, when engaged by the closing sleeve, to effect inward displacement of the toothed portions of the fingers into holding engagement with the annular shoulder of the sheath, Fig. 4.

The clutch closing ring can be slipped over the small end of the sleeve up into position over the clutch fingers before the sleeve is seated in its bearing in the head. Then after the retainer nut 17, has been applied to secure the sleeve, the ring can not be backed off because it will be stopped by the adjoining end face of the head, as in Figs. 2 and 3.

Movement of the ring in the clutch closing direction is limited, as shown particularly in Figs. 1 and 4, by outwardly extending radial projections 32, on the free ends of the clutch fingers, substantially opposite the inwardly projecting clutch teeth. These stop lugs fit within an enlarged cylindrical portion 33, in the end of the ring and are engaged by the annular shoulder 34, at the inner end of this cylindrical cavity to limit movement of the ring in the clutch closing direction.

Preferably, the lugs 32 and the confining chamber 33, are so related that the clutch teeth 27, will be held engaged over the shoulder 28, on the sheath, with the body portions of the fingers clear and out of scraping engagement with the sheath as in Fig. 4, thus to leave the sheath free to turn easily while retained in the grip of the clutch. In this relation too, the ring preferably has a light frictional engagement over the fingers, so as to be free to rotate and roll naturally in the grasp of the hand operating the tool.

For the purpose of yieldingly retaining the ring in the clutch closing position, the spring fingers may be formed with substantially cylindrical lands 35, Figs. 2 and 3, engageable inside the main body portion of the ring in the clutch closed position. These lands under the spring expanding force of the fingers, apply a light yielding friction, opposing longitudinal shifting of the ring in the clutch opening direction, without materially or objectionably interfering with the free rotation of the ring on the clutch fingers.

In the connected relation of the parts shown in Figs. 1 and 4, both the sheath 7, and the clutch closing ring 30, are free to turn, independently of each other and so may yield and roll one way or the other, in the changing grasp of the fingers holding the tool. The clutch controlling ring is symetrical and concentric with the sheath and so presents no obstruction to such free turning movements in any position that it may be left in. The ring while retained against accidental or unintentional releasing movement, can at any time be immediately intentionally released by a simple longitudinal sliding movement, which can be effected at any position of the tool parts by grasping it in the fingers and pulling it back from over the clutch jaws or by simply pushing it back by pressure applied to the end of it at any point in the circumference most convenient at the time. When retracted, the ring will ordinarily remain in substantially this position, Figs. 2 and 3, by the light frictional engagement over the spring fingers and be held back in such position by the inclined cam shoulders 31. Thus the clutch when opened will normally stand in this relation, ready to admit the end of the sheath.

The collar 24, forming the base or carrier for the spring clutch fingers serves in the illustration, as a stop for the inner end of the sheath, which as indicated in Fig. 4, may have a free rotating abutting engagement with said collar and in which relation, the annular groove in the sheath will be positioned to admit the holding teeth of the clutch fingers.

In the combination illustrated, where the spindle is driven through the cooperating teeth of a jaw clutch carried by the pulley flange and body of the spindle, the entire spindle is free to come away with the sheath in the manner indicated in Fig. 2. Conversely, the spindle and sheath are ready to be assembled and connected in place by simply thrusting the sheath, and with it, the spindle into the open end of the mounting sleeve 8, the drive clutch elements 20, 22, of the pulley and spindle mating in this movement and similarly, the shoulder 28, on the sheath passing beneath the retaining teeth 27, ready for the closing engagement of the latter, effected by shifting the ring into the clutch closing position shown in Fig. 4.

The ready removability and disconnection of the sheath and spindle make it practical to quickly substitute a contra angle tool for a straight tool or vice versa. In each case, this can be done without disturbing the pulley or the belt drive connections and in both cases, the spindle is driven without imposing any side strains or belt vibrations on the spindle.

The clutch controlling ring 30, can be of small outside diameter, that is, not much larger than the sheath, so as not to add objectionably to the bulk of the tool and being concentric, it does not throw the tool out of balance in any way. For ornamental purposes and also as an aid to the grasp of the fingers, it may be formed exteriorly with slight grooves and ridges, as illustrated, or be otherwise marked, or be left smooth and plain.

In using the handpiece, drilling pressure is applied through the medium of the sheath grasped in the fingers. The engagement of the clutch fingers in the annular groove 29, in the sheath forms a connection from the sheath to the other portions of the device, thus to transmit the applied drilling pressure equally and uniformly about the center of the tool.

In the construction shown, the ring is firmly retained in the clutch closed position, Figs. 1 and 4, by spring frictional engagement between the spring fingers and ring. Further interlock or holding action may be had by providing an annular groove inside the chambered end portion 33, of the ring to receive the radial projections 32, and the latter, if desired, may be more or less abruptly inclined or angled at their outer ends to snap into such a groove with an interlocking holding engagement.

In some instances, it may be considered desirable to positively lock the ring in the clutch closed position. An example of such a lock is illustrated in Fig. 5, it being shown there as a small U-bent sheet metal bracket 35, having the folded side portions of the same embracing and pivotally mounted on the post 12, at 36, and having an angularly extending lug 37, on the mid-portion of the same projecting into position to stand behind the inner end of the ring 30. The lower portion of this catch element is shown as extended upward between the two side portions to form a spring tongue 38, curved at its free end to engage the front of the post at two relatively spaced points at 39, both below the pivotal center 36. This spring thereby acts to position the catch in the relation shown in Fig. 5, that is, clear of actual engagement with the clutch collar 24, the spring fingers 25, or the clutch closing ring 30, but in line with the latter and therefore capable of blocking any clutch releasing movement of the ring.

When a safety lock such as illustrated, is used the ring is positively locked in the clutch closed position, but can be released at any time, upon applying pressure to the catch member 35, below the pivotal center 36, to rock the locking lug 37, below the edge of the ring 30.

While the safety lock is shown in the nature of an accessory or attachment, which may or may not be applied to the stock of the hand piece, it is contemplated that it may be built in as a more permanent part of the device and if desired, be incorporated in such a way as to be more or less concealed within the body or other portions of the hand piece.

What is claimed is:

1. A dental handpiece, comprising a sheath having an external annular groove therein, spring fingers extending from the end of the sheath longitudinally over the same substantially to said groove, said fingers having inwardly extending teeth and outwardly extending lugs at the free ends of the same, said teeth positioned to enter said groove, a ring longitudinally slidable over said spring fingers to contract the same into position with said teeth entered in said groove, said ring having an annular cavity receiving said lugs in said contracting position of said ring and an internal support for said sheath, said spring fingers being mounted on said internal support, said spring fingers being biased in the opening direction to clear the teeth from said groove and said closing ring having an annular shoulder engageable with the outwardly extending lugs to prevent escape of the ring from the fingers and to limit the extent of closing movement of the fingers to a point where the inwardly extending teeth will loosely enter the groove and thereby retain the sheath in relatively rotatable relation.

2. A dental handpiece, comprising a headpiece, a sheath removably engaged thereon, a clutch for removably retaining said sheath in position and including a clutch closing ring shiftable longitudinally of the sheath to effect release of the latter, a safety lock for preventing unintentional releasing movement of said clutch closing ring, said lock including a stop pivotally mounted on the headpiece in position to block releasing movement of the ring and spring means for yieldingly holding said stop in the ring-blocking position.

3. A dental handpiece, comprising a headpiece, a sheath removably engaged thereon, a clutch for removably retaining said sheath in position and including a clutch closing ring shiftable longitudinally of the sheath to effect release of the latter, a safety lock for preventing unintentional releasing movement of said clutch closing ring, said lock including a stop member movably supported on the headpiece in position to block clutch releasing movement of said ring and means for releasably holding said stop member in the ring blocking position.

4. A dental handpiece, comprising a headpiece having a post portion, a sheath removably engageable with said headpiece, a sheath retaining clutch, including a clutch retaining ring movable toward said post portion, a stop member pivotally mounted on said post portion, in position to prevent clutch releasing movement of said ring and spring means for yieldingly holding said stop member in said ring blocking position.

5. A dental handpiece comprising a supporting head having a stationary projecting hub at one side and a bearing extending from the opposite side out through said projecting hub, a spindle of lesser diameter than said bearing and insertable into said bearing at said opposite side of the head into position with the inserted end of the spindle projecting beyond the end of said stationary hub, a sheath rotatably engageable on the head over said spindle to rotatably confine said spindle in said bearing and removable to permit free withdrawal of the spindle from said inserted position in the bearing, spring fingers projecting from the head longitudinally over opposite sides of the sheath, said fingers having radially and inwardly projecting retaining lugs at the free ends of the same and the sheath having a continuous annular groove to rotatably receive said retaining lugs, said fingers being spring biased in an opening direction to clear said retaining lugs of said annular groove, a ring longitudinally slidable over said spring fingers and having an annular internal cam surface to contract said spring fingers far enough for the retaining lugs on the ends of the same to loosely enter in said annular groove and thereby rotatably confine the sheath on the head, a drive pulley surrounding and journalled on the stationary projecting hub, means rotatably confining said pulley supported in said journalled position on the stationary hub independently of the spindle and whereby said spindle may be freely inserted into its bearing or be withdrawn from the bearing and removed from the head without disturbing the pulley rotatably supported on the stationary hub of the head and coacting endwise engageable clutch elements on the pulley and projecting end portion of the inserted spindle freely engageable and disengageable in the longitudinal insertion of the spindle in and removal of the same from said bearing for effecting automatic coupling of the spindle to the pulley and uncoupling of the spindle from the pulley by the simple act of inserting the spindle in or removing it from the bearing in the head.

6. A dental handpiece comprising a supporting head having a stationary projecting tubular hub at one side and a bearing passage extending from the opposite side of the head concentrically through said tubular projecting hub, a bearing sleeve journalled in said bearing passage and extending through said stationary projecting hub, means engaged with the extended end of said bearing sleeve and with the end of said stationary hub for rotatably confining said bearing sleeve in the head, said bearing sleeve having a supporting portion projecting from said opposite side of the head, a sheath engaged over said supporting portion of the bearing sleeve, means on said supporting portion for releasably confining said sheath in supported position, said bearing sleeve having a concentric bearing passage therethrough, a spindle journalled in said last mentioned bearing passage and rotatably confined therein by said sheath and whereby upon removal of said sheath said spindle may be slipped out of said bearing passage, the inner end of said spindle when so confined by the sheath projecting inwardly through and beyond the end of the stationary hub and provided with a radially projecting clutch element of less radial extent than the diameter of the bearing passage in which the spindle is journalled, a drive pulley rotatably confined and supported on the stationary hub wholly independently of the removable spindle, and a flange carried by the outer side of the pulley extending radially inwardly over the adjoining end of the stationary hub and having a radially extending clutch element projecting inwardly beyond the diameter of the bearing passage in which the spindle is journalled and cooperable with the clutch element on the projecting end of the spindle.

JOHN WAHLBERG.